United States Patent
Ishida et al.

(10) Patent No.: US 9,245,035 B2
(45) Date of Patent: Jan. 26, 2016

(54) INFORMATION PROCESSING SYSTEM, INFORMATION PROCESSING METHOD, PROGRAM, AND NON-TRANSITORY INFORMATION STORAGE MEDIUM

(75) Inventors: Takayuki Ishida, Tokyo (JP); Hideaki Watanabe, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 471 days.

(21) Appl. No.: 13/602,786

(22) Filed: Sep. 4, 2012

(65) Prior Publication Data

US 2013/0066894 A1    Mar. 14, 2013

(30) Foreign Application Priority Data

Sep. 13, 2011    (JP) .................................. 2011-199072

(51) Int. Cl.
*G06F 17/30* (2006.01)
*G06Q 50/00* (2012.01)

(52) U.S. Cl.
CPC .......... *G06F 17/30867* (2013.01); *G06Q 50/01* (2013.01)

(58) Field of Classification Search
CPC . G06F 19/3456; G06F 21/56; G06F 19/3437; G06F 17/30861; G06F 19/18; G06F 19/22; G06F 19/325; G06F 19/326; G06F 19/3406; G06F 21/566; G06F 17/3053; G06F 17/30867; G06Q 30/02; G06N 5/022; G06N 99/005
USPC .................................. 705/26.1; 709/204, 224
See application file for complete search history.

(56) References Cited

U.S. PATENT DOCUMENTS

| | | | | |
|---|---|---|---|---|
| 8,615,442 | B1* | 12/2013 | Kapur et al. .................. | 705/26.1 |
| 2009/0100169 | A1* | 4/2009 | Allen et al. ................... | 709/224 |
| 2009/0276377 | A1* | 11/2009 | Dutta et al. ..................... | 706/12 |
| 2012/0324008 | A1* | 12/2012 | Werz et al. .................... | 709/204 |

* cited by examiner

*Primary Examiner* — Dinku Gebresenbet
(74) *Attorney, Agent, or Firm* — Matthew B. Dernier, Esq.

(57) ABSTRACT

A cluster value identifying unit identifies a value of a parameter representing a level of a ground swell of interest related to provided information, which is determined in accordance with registration of information related to the provided information. A period identifying unit identifies, based on the value of the parameter, a period in which the ground swell of interest related to the provided information grows with a lapse of time. A user feature identifying unit identifies, based on the identified period, a feature of a user who registers the related information. Accordingly, the feature of the user may be identified based on the registration of the information related to the provided information.

9 Claims, 7 Drawing Sheets

| RANK | USER ID | SCORE | |
|---|---|---|---|
| 1 | John | 873 | }44 |
| 2 | Anne | 451 | }44 |
| 3 | Kenny | 301 | }44 |
| 4 | Andy | 256 | }44 |
| 5 | Tom | 112 | }44 |

PIONEER USER LIST

| RANK | USER ID | SCORE |
|---|---|---|
| 1 | John | 873 |
| 2 | Anne | 451 |
| 3 | Kenny | 301 |
| 4 | Andy | 256 |
| 5 | Tom | 112 |

INFORMATION PROCESSING SYSTEM, INFORMATION PROCESSING METHOD, PROGRAM, AND NON-TRANSITORY INFORMATION STORAGE MEDIUM

CROSS-REFERENCE TO RELATED APPLICATIONS

The present application claims priority from Japanese application JP 2011-199072 filed on Sep. 13, 2011, the content of which is hereby incorporated by reference into this application.

BACKGROUND OF THE INVENTION

1. Field of the Invention

The present invention relates to an information processing system, an information processing method, a program, and a non-transitory information storage medium.

2. Description of the Related Art

There exist various social media that allow a user to send out information with ease. Examples of such social media include an electronic bulletin board, a blog, a wiki, social bookmarking, 1Twitter (trademark), and a social networking service.

There is also known a tool for analyzing content registered in the social media. By using such a tool, for example, it is possible to identify a relationship between users who use the social media or identify hot topics.

SUMMARY OF THE INVENTION

The social media may involve registration of information (hereinafter, referred to as "related information") related to information (hereinafter, referred to as "provided information") such as news provided to users (for example, posting of a blog article or a comment indicating a reaction to the provided information, such as impressions thereon, and registration of a social bookmark for a web page containing news). Some of the users who register the related information may register the related information during a period in which a ground swell of interest related to the provided information grows with a lapse of time, and others may register the related information after a peak of the ground swell of interest related to the provided information has passed.

Therefore, it is conceivable that a feature of the user can be identified based on an analysis of the registration of the related information performed by the user. For example, a group of users who register the related information during the period in which the ground swell of interest related to the provided information grows with the lapse of time can be identified as a group of users who are highly sensitive to the trend, or a group of users who register the related information after the peak of the ground swell of interest related to the provided information has passed can be identified as a group of users who are less sensitive to the trend. However, with the conventional analysis technology, it is not possible to identify the feature of the user based on the registration of the related information.

The present invention has been made in view of the above-mentioned problem, and an object of some embodiments of the invention is to allow a feature of a user to be identified based on registration of information related to provided information.

In order to solve the above-mentioned problem, according to an exemplary embodiment of the present invention, there is provided an information processing system, including: a value identifying unit that identifies a value of a parameter representing a level of a ground swell of interest related to provided information, which is determined in accordance with registration of information related to the provided information; a period identifying unit that identifies, based on the value of the parameter, a period in which the ground swell of interest related to the provided information grows with a lapse of time; and a feature identifying unit that identifies, based on the identified period, a feature of a user who registers the related information.

According to an exemplary embodiment of the present invention, there is also provided the information processing method, including: identifying a value of a parameter representing a level of a ground swell of interest related to provided information, which is determined in accordance with registration of information related to the provided information; identifying, based on the value of the parameter, a period in which the ground swell of interest related to the provided information grows with a lapse of time; and identifying, based on the identified period, a feature of a user who registers the related information.

According to an exemplary embodiment of the present invention, there is also provided a program stored in a non-transitory computer readable information storage medium, which is to be executed by a computer, the program including instructions to: identify a value of a parameter representing a level of a ground swell of interest related to provided information, which is determined in accordance with registration of information related to the provided information; identify, based on the value of the parameter, a period in which the ground swell of interest related to the provided information grows with a lapse of time; and identify, based on the identified period, a feature of a user who registers the related information.

According to an exemplary embodiment of the present invention, there is also provided a non-transitory computer readable information storage medium storing a program which is to be executed by a computer, the program including instructions to: identify a value of a parameter representing a level of a ground swell of interest related to provided information, which is determined in accordance with registration of information related to the provided information; identify, based on the value of the parameter, a period in which the ground swell of interest related to the provided information grows with a lapse of time; and identify, based on the identified period, a feature of a user who registers the related information.

According to the exemplary embodiment of the present invention, the feature of the user who registers the related information is identified based on the period in which the ground swell of interest related to the provided information grows with the lapse of time, which allows the feature of the user to be identified based on the registration of the information related to the provided information.

According to the exemplary embodiment of the present invention, the feature identifying unit identifies the feature of the user based on a number of pieces of the related information registered by the user within the period identified by the period identifying unit.

Further, according to the exemplary embodiment of the present invention, the value identifying unit identifies a number of times that the related information is registered per unit time, and the period identifying unit identifies the period during which the number of times that the related information is registered per unit time tends to increase.

Further, according to the exemplary embodiment of the present invention, the value identifying unit identifies a number of times that a comment including a keyword related to the provided information is registered per unit time, and the period identifying unit identifies the period during which the number of times that the comment including the keyword is registered per unit time tends to increase.

Further, according to the exemplary embodiment of the present invention, the value identifying unit identifies a number of times that a social bookmark for a web page on which information is provided is registered per unit time, and the period identifying unit identifies the period during which the number of times that the social bookmark for the web page on which the information is provided is registered per unit time tends to increase.

According to another exemplary embodiment of the present invention, there is provided an information processing system, including: an acquisition unit that acquires at least one of: (1) a value of a parameter representing a level of a ground swell of interest related to provided information, which is determined in accordance with registration of information related to the provided information; (2) information representing a period in which the groundswell of interest related to the provided information grows with a lapse of time, which is identified based on the value of the parameter; and (3) information representing a feature of a user who registers the related information, which is identified based on the identified period; and a presentation unit that presents information generated based on the information acquired by the acquisition unit.

DETAILED DESCRIPTION OF THE INVENTION

First Embodiment

Hereinafter, a first embodiment of the present invention is described in detail below referring to the drawings.

Figure 1:
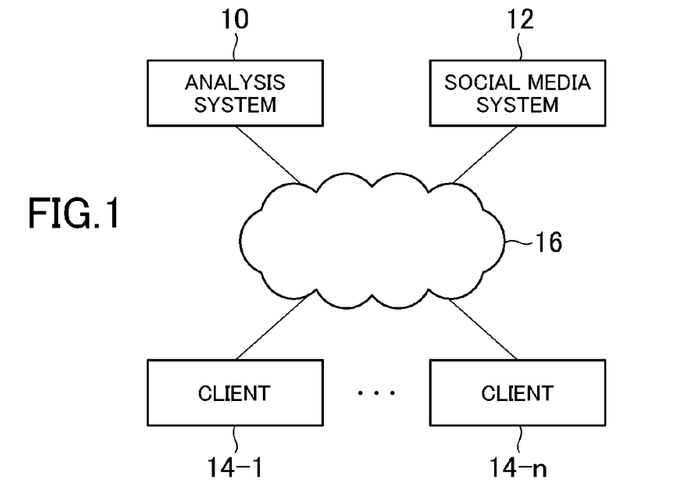
FIG. 1 is an overall configuration diagram of a computer network according to an embodiment of the present invention.

FIG. 1 is a diagram illustrating an overall configuration of a computer network 16 according to the first embodiment of the present invention. As illustrated in FIG. 1, an analysis system 10, asocial media system 12, and clients 14 (14-1 to 14-n), which are all constructed based on computers, are connected to the computer network 16 such as the Internet. The analysis system 10, the social media system 12, and the clients 14 can communicate to/from one another.

The analysis system 10, which is a computer system such as a server functioning as an information processing system of this embodiment, performs analysis of data registered in the social media system 12. The social media system 12 is, for example, a computer system such as a server that provides a service for making public content received from users. The social media system 12 according to this embodiment provides an electronic bulletin board service.

The analysis system 10 and the social media system 12 each include, for example, a control unit that is a program control device such as a CPU which operates in accordance with a program installed on an own device, a storage unit that is a memory device such as a ROM or a RAM, or a hard disk drive, and a communication unit that is a communication interface such as a network board. Those components are connected to each other via a bus. The storage units of the analysis system 10 and the social media system 12 store programs executed by the control units of the own devices. Further, the storage units of the analysis system 10 and the social media system 12 operate as work memories of the own devices.

The client 14, which is a computer utilized by a user of the analysis system 10 or the social media system 12, is, for example, a personal computer, a game console, a television set, a portable game device, or a portable information terminal. The client 14 includes, for example, a control unit such as a CPU, a storage unit such as a storage element including a ROM or a RAM, or a hard disk drive, an output unit such as a display or a speaker, an input unit such as a game controller, a touch pad, a mouse, a keyboard, or a microphone, a communication unit such as a network board, and an optical disc drive unit that reads an optical disc (computer readable information storage medium) such as a DVD-ROM or Blu-ray (trademark) disc.

The client 14 of this embodiment has a web browser installed therein in advance. According to this embodiment, the client 14 accesses the analysis system 10 through the web browser, and inputs a user ID and a password, which are registered in the analysis system 10, to log in. Then, when the client 14 accesses a predetermined URL, a screen corresponding to the predetermined URL is displayed on the display of the client 14. Further, according to this embodiment, the client 14 accesses the social media system 12 through the web browser, and inputs a user ID and a password, which are registered in the social media system 12, to log in. Then, when the client 14 accesses a predetermined URL, a screen corresponding to the predetermined URL is displayed on the display of the client 14. After the entry of the user ID and the password, the analysis system 10 and the social media system 12 can determine the user ID of the user who utilizes the client 14 by, for example, referring to a session ID.

The social media system 12 according to this embodiment is configured to be able to receive a post of the content such as a comment from the client 14. Then, the posted content is stored in the storage unit included in the social media system 12. Then, the social media system 12 transmits the posted content to the client 14 in response to a request received from the client 14. When receiving the content, the client 14 displays the content on the display. In this manner, the content posted by the user is made public.

Figure 2:
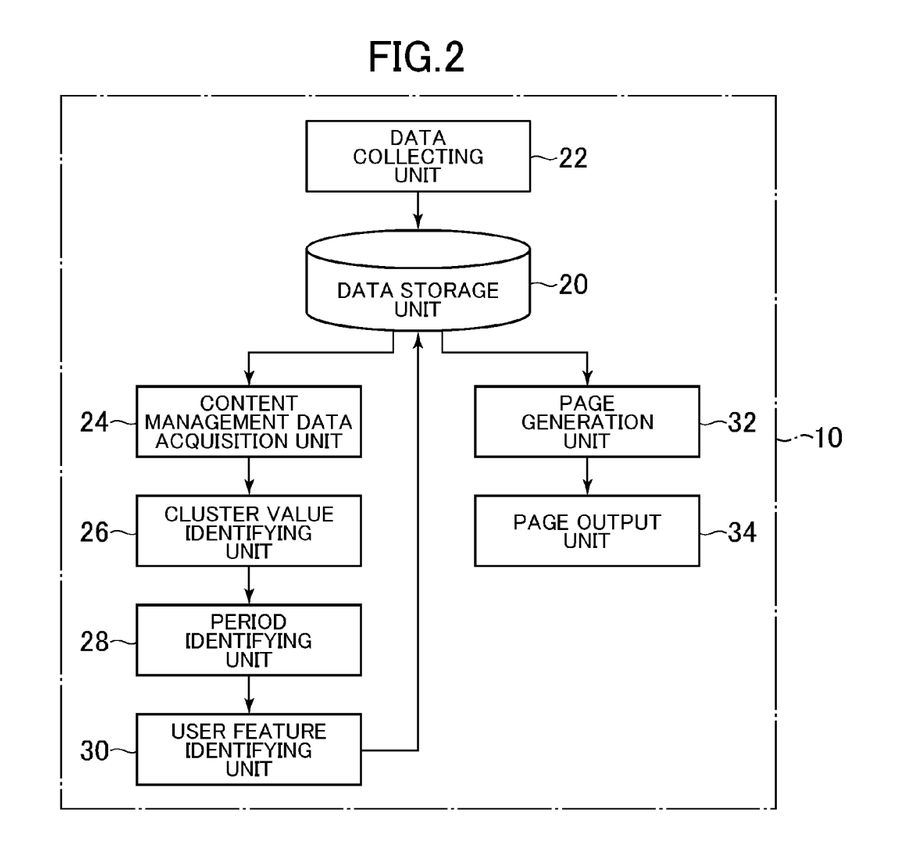
FIG. 2 is a functional block diagram illustrating an example of functions implemented by an analysis system according to the embodiment of the present invention.

FIG. 2 is a functional block diagram illustrating an example of functions implemented by the analysis system 10 according to the embodiment of the present invention. As illustrated in FIG. 2, the analysis system 10 functionally includes a data storage unit 20, a data collecting unit 22, a content management data acquisition unit 24, a cluster value identifying unit 26, a period identifying unit 28, a user feature identifying unit 30, a page generation unit 32, and a page output unit 34. The data storage unit 20 is implemented mainly by the storage unit included in the analysis system 10. The other components are implemented mainly by the control unit included in the analysis system 10.

Those functions are implemented by executing a program according to this embodiment in the analysis system 10 that is a computer. This program may be downloaded from another computer via a communication interface through a computer communication network, or may be stored in a computer readable non-transitory information storage medium such as an optical disc (for example, CD-ROM, DVD-ROM, or Blu-ray disc) or a universal serial bus (USB) memory and installed in the analysis system 10 therefrom via an optical disc drive, a USB port, or the like.

Figure 3:
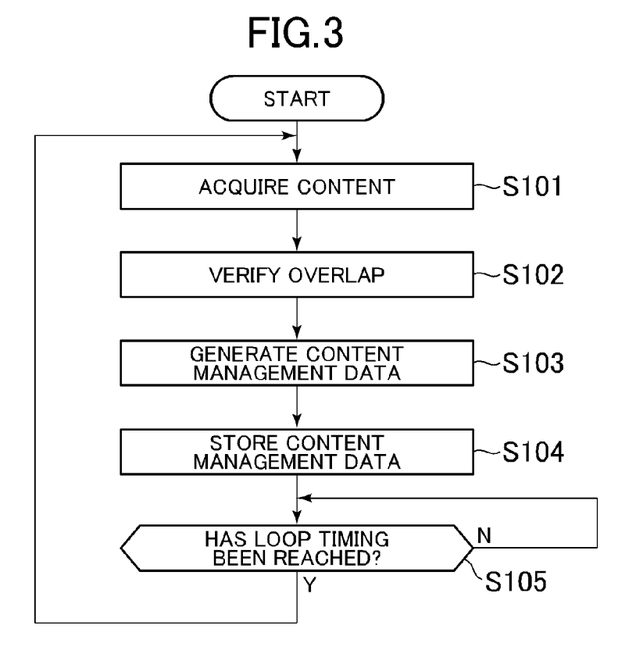
FIG. 3 is a flowchart illustrating an example of a flow of processing performed by the analysis system according to the embodiment of the present invention.

Here, referring to a flowchart illustrated in FIG. 3, a description is made of an example of a flow of collection processing for the content subjected to an analysis, which is performed in the analysis system 10 according to this embodiment. Note that, in this embodiment, the data storage unit 20 previously stores condition data representing a condition related to the content acquired from the social media system 12. The condition data can be set by the user of the analysis system 10. Here, for example, it is assumed that a predetermined keyword character string is stored in the data storage unit 20 as the condition data.

Figure 4:
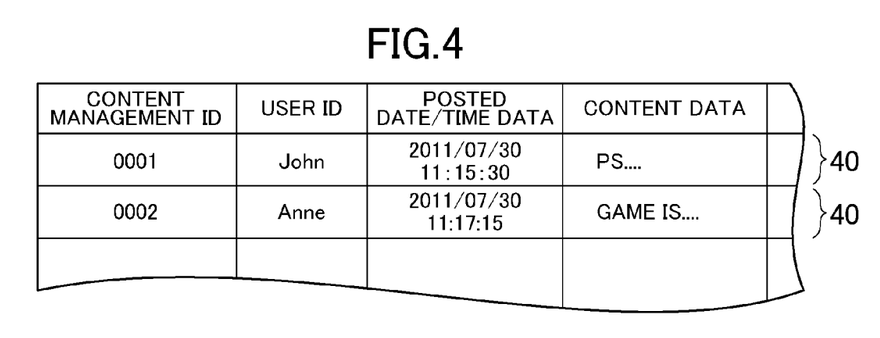
FIG. 4 is a diagram illustrating an example of content management data.

First, the data collecting unit 22 acquires, from the social media system 12, the content which has been posted to the social media system 12 by the user and which satisfies the condition represented by the above-mentioned condition data (S101). Then, the data collecting unit 22 verifies whether or not there is content acquired in the processing illustrated as Step S101 which overlaps with already-acquired content, and excludes the already-acquired content from the subjects of the subsequent processing (S102). Then, the data collecting unit 22 generates the content management data 40 exemplified in FIG. 4 based on the content that has not been excluded in the processing illustrated as Step S102 (S103). In this manner, in this embodiment, the content acquired from the social media system 12 is managed as the content management data 40. The content management data 40 includes, as illustrated in FIG. 4, for example, a content management ID that is an identifier of the content management data 40, a user ID that is an identifier of the user who posted the content, posted date/time data representing a date/time at which the content was posted, and content data representing the content posted (in this embodiment, comment). Then, the data collecting unit 22 causes the data storage unit 20 to store the content management data 40 generated in the processing illustrated as Step S103 (S104). Then, the data collecting unit 22 monitors whether or not a predefined loop timing has been reached (for example, whether or not one hour has elapsed since the processing illustrated as Step S101 was started) (S105), and under the condition that the loop timing is reached, executes the processing of Step S101 and the subsequent processing again.

In this manner, in this embodiment, the content management data 40 based on the content posted to the social media system 12 is accumulated in the data storage unit 20.

Figure 5:
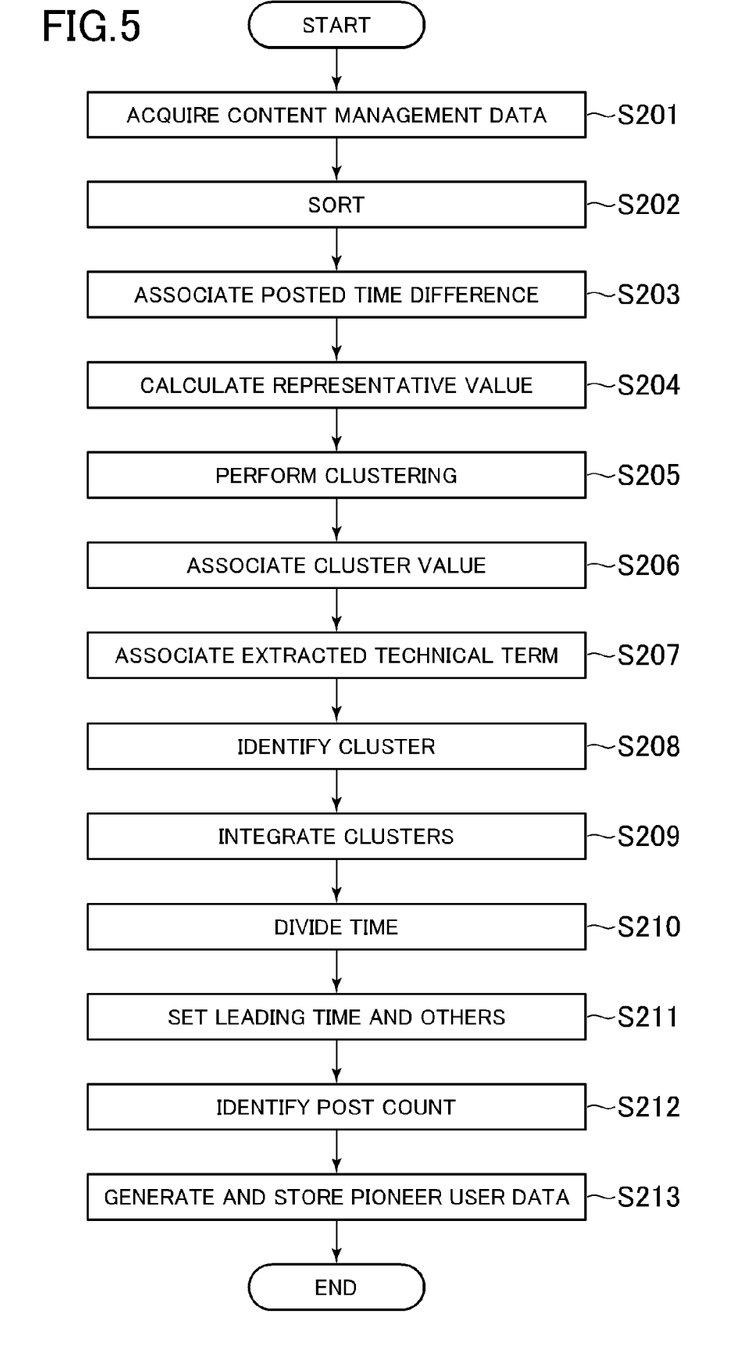
FIG. 5 is a flowchart illustrating an example of a flow of processing performed by the analysis system according to the embodiment of the present invention.

Next, referring to a flowchart illustrated in FIG. 5, a description is made of an example of a flow of analysis processing for the content posted to the social media system 12 based on the content management data 40, which is performed in the analysis system 10 according to this embodiment.

First, the content management data acquisition unit 24 acquires the content management data 40 stored in the data storage unit 20 (S201). Then, the cluster value identifying unit 26 sorts the content management data 40 acquired in the processing illustrated as Step S201 in such an order that one whose posted date/time represented by the posted date/time data included in the content management data 40 is earlier comes first (S202). Then, the cluster value identifying unit 26 associates each piece of the content management data 40 that does not come first in the order of the date/time at which the content was posted with a posted time difference that is a time difference between the posted date/time represented by the posted date/time data included in the content management data 40 and the posted date/time represented by the posted date/time data included in the content management data 40 that comes immediately before in the order of the date/time at which the content was posted (S203). Then, the cluster value identifying unit 26 calculates a representative value of the posted time differences calculated for each piece of the content management data 40 that does not come first in the order of the date/time at which the content was posted in the processing illustrated as Step S203 (in this embodiment, for example, median of a plurality of posted time differences) (S204).

Then, the cluster value identifying unit 26 executes clustering of the content management data 40 based on the posted time differences associated therewith (S205).

Figure 6:
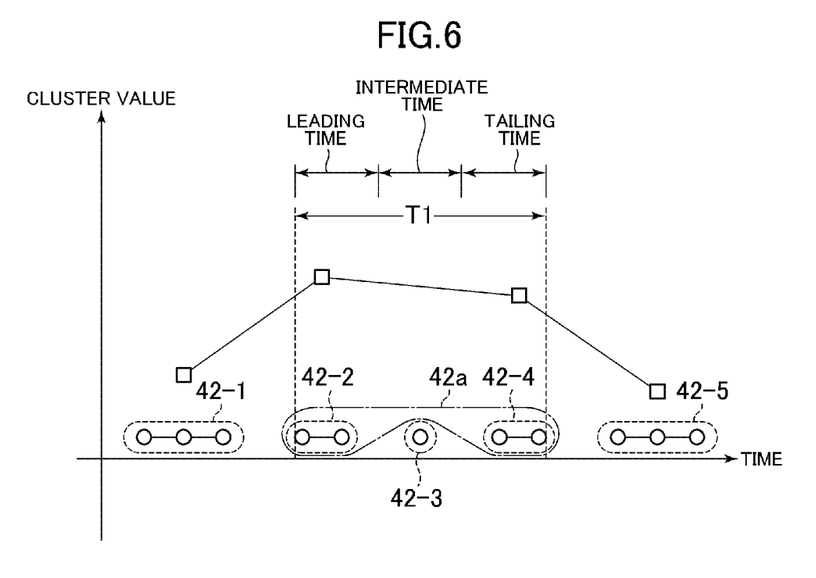
FIG. 6 is a diagram schematically illustrating an example of an execution situation of the processing performed by the analysis system according to the embodiment of the present invention.

FIG. 6 is a diagram schematically illustrating an example of an execution situation of Step S205 and the subsequent processing. In this processing example, in the processing illustrated as Step S205, for example, the cluster value identifying unit 26 sets the content management data 40 that comes first in the order of the date/time at which the content was posted as a member belonging to a first cluster 42. Then, with regard to a given piece of content management data 40 that comes second or later in the order of the date/time at which the content was posted, if the posted time difference associated with that is smaller than the representative value calculated in the processing illustrated as Step S204, the cluster value identifying unit 26 sets the given piece of content management data 40 as the member belonging to the same cluster 42 as the content management data 40 that comes immediately before in the order of the date/time at which the content was posted, and otherwise, sets the given piece of the content management data 40 as the member belonging to a new cluster 42.

In FIG. 6, the posts corresponding to the content management data 40 are indicated by the circle marks. The horizontal axis illustrated in FIG. 6 is a time axis indicating an earlier time instant on the left and a late time instant on the right. With regard to each of the circle marks, a position obtained by projecting the circle mark on the horizontal axis corresponds to the time instant at which the content corresponding to the circle mark was posted.

Further, a group of circle marks coupled to each other by a line segment indicates the above-mentioned cluster 42. FIG. 6 illustrates five clusters 42 (first cluster 42-1, second cluster 42-2, third cluster 42-3, fourth cluster 42-4, and fifth cluster 42-5). In FIG. 6, the first cluster 42-1 indicates that three pieces of content management data 40 belong thereto, the second cluster 42-2 indicates that two pieces of content management data 40 belong thereto, the third cluster 42-3 indicates that one piece of content management data 40 belongs thereto, the fourth cluster 42-4 indicates that two pieces of content management data 40 belong thereto, and the fifth cluster 42-5 indicates that three pieces of content management data 40 belong thereto. As illustrated in FIG. 6, in the processing illustrated as Step S205, a series of content management data 40 within which an interval of the date/time at which the content was posted is smaller than the above-mentioned representative value are set to belong to the same cluster 42.

Then, with regard to each of the clusters 42 set in the processing illustrated as Step S205, the cluster value identifying unit 26 identifies a cluster value that is a value of a parameter representing a level of a ground swell of interest in the posts that satisfy the condition represented by the above-mentioned condition data, and associates the cluster 42 therewith (S206). In this processing example, the cluster value represents a posting speed (number of times that a post is made per unit time) of the content represented by the content management data 40 belonging to the cluster 42, and is calculated by a mathematical expression, for example, ((number of content management data 40 belonging to the cluster 42)−1)/(time that has passed since the posted date/time represented by the posted date/time data included in the content management data 40 corresponding to the first posted content among the content management data 40 belonging to the cluster 42 until the posted date/time represented by the posted date/time data included in the content management data 40 corresponding to the last posted content among the content management data 40 belonging to the cluster 42). Note that, in this processing example, the cluster value is not set for the cluster 42 the number of members belonging thereto is one (in the example of FIG. 6, third cluster 42-3).

The vertical axis illustrated in FIG. 6 indicates a magnitude of the cluster value. In FIG. 6, the cluster values corresponding to the first cluster 42-1, the second cluster 42-2, the fourth cluster 42-4, and the fifth cluster 42-5 are indicated by square marks. Further, FIG. 6 indicates that the cluster values associated with the second cluster 42-2 and the fourth cluster 42-4 are larger than the cluster values associated with the first the cluster 42-1 and the fifth cluster 42-5.

Then, with regard to each of the clusters 42 set in the processing illustrated as Step S205, the cluster value identifying unit 26 extracts a technical term that appears a predetermined number of times or more from a character string represented by the content data included in the content management data 40 belonging to the cluster 42, and associates the extracted technical term with the cluster 42 (S207).

Then, the period identifying unit 28 identifies the cluster 42 whose cluster value identified in the processing illustrated as Step S206 is large (for example, cluster 42 whose associated cluster value is large within top five percent among the clusters whose cluster values have been calculated) (S208). Here, for example, it is assumed that the second cluster 42-2 and the fourth cluster 42-4 in FIG. 6 are identified.

Then, of the clusters 42 associated with the cluster values (that is, the clusters 42 which are the candidates for the identification in the processing illustrated as Step S208), under the condition that the plurality of clusters 42 that are continuous in terms of the associated posted date/time are identified in the processing illustrated as Step S208, the period identifying unit 28 integrates those plurality of clusters collectively into one cluster (S209). In FIG. 6, the second cluster 42-2 and the fourth cluster 42-4 are identified, and hence the second cluster 42-2 and the fourth cluster 42-4 are integrated collectively into one cluster (integrated cluster 42a).

Then, the period identifying unit 28 divide time corresponding to the cluster 42 identified in the processing illustrated as Step S208 and Step S209 (for example, in FIG. 6, time T1 that has passed since the date/time represented by the posted date/time data included in the content management data 40 corresponding to the first posted content among the content management data 40 belonging to the integrated cluster 42a until the posted date/time represented by the posted date/time data included in the content management data 40 corresponding to the last posted content among the content management data 40 belonging to the integrated cluster 42a) into three sections of time having an equal time length (for example, three sections of time each of which has a length of time of T1/3) (S210). Then, the period identifying unit 28 sets the respective sections of time obtained by the dividing as a leading time, an intermediate time, and a tailing time in chronological order (S211). In the example of FIG. 6, only one cluster 42 (the integrated cluster 42a) is identified in the processing illustrated as Step S208 and Step S209, but in a case where a plurality of cluster 42 (including integrated cluster 42a) are identified in the processing illustrated as Step S208, the leading time, the intermediate time, and the tailing time are set for each of the clusters 42 identified in the processing illustrated as Step S209. In the first embodiment, a leading period is handled as a period in which the ground swell of interest related to the information provided to the users grows with a lapse of time.

Then, based on the content management data 40, the user feature identifying unit 30 identifies a post count indicating the number of posts made by each of the users within the range of the leading time (S212). In a case where the plurality of leading times are set in the processing illustrated as Step S211, the user feature identifying unit 30 identifies a total sum of the post counts indicating the numbers of posts made by each of the users within the range of the respective leading times. Then, the user feature identifying unit 30 generates pioneer user data 44 exemplified in FIG. 7 which includes: a rank that is set in order from the user whose post count identified in the processing illustrated as Step S212 is larger and is associated with each of the users; the user ID of the user; and a score representing the post count that is identified in the processing illustrated as Step S212 for each of the users, causes the data storage unit 20 to store the pioneer user data 44 (S213), and finishes the processing illustrated in this processing example.

The page generation unit 32 acquires at least one of the cluster value, the information representing a pioneer time interval, and the pioneer user data 44 in response to a request received from the user of the analysis system 10 after the above-mentioned processing is finished. Then, based on the acquired data, the page generation unit 32 generates a cluster detection result page 46 illustrated in FIG. 8. Then, the page output unit 34 transmits the generated cluster detection result page 46 to the client 14. When receiving the cluster detection result page 46, the client 14 displays the cluster detection result page 46 on the display.

Figure 8:
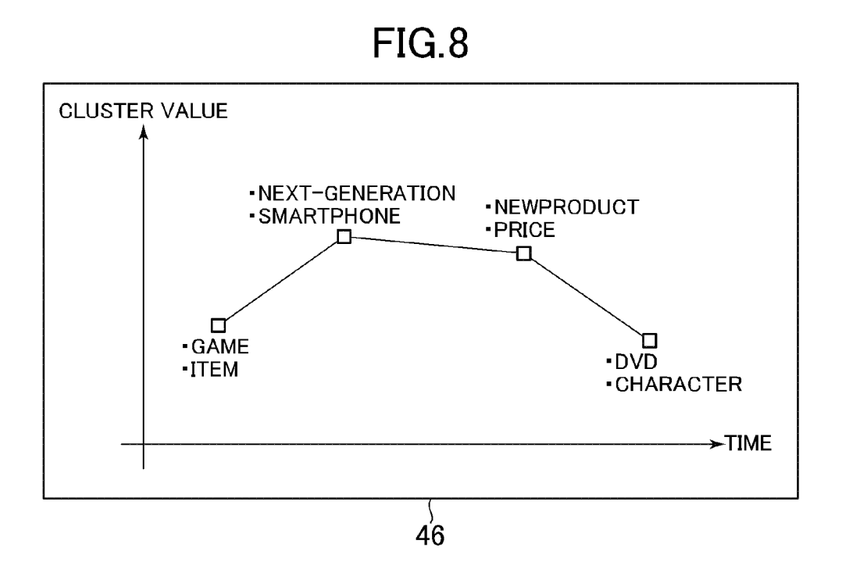
FIG. 8 is a diagram illustrating an example of a cluster detection result page.

Indicated on the cluster detection result page 46 illustrated in FIG. 8 is a temporal change of the cluster value similar to what is illustrated in FIG. 6. Further, on the cluster detection result page 46 illustrated in FIG. 8, the clusters 42 whose cluster values have been calculated are associated with the technical terms extracted from the content data included in the content management data 40 belonging to the clusters 42 in the above-mentioned processing illustrated as Step S207. Note that, the technical term extracted from the above-mentioned third cluster 42-3 may be placed on the cluster detection result page 46.

Figure 9:
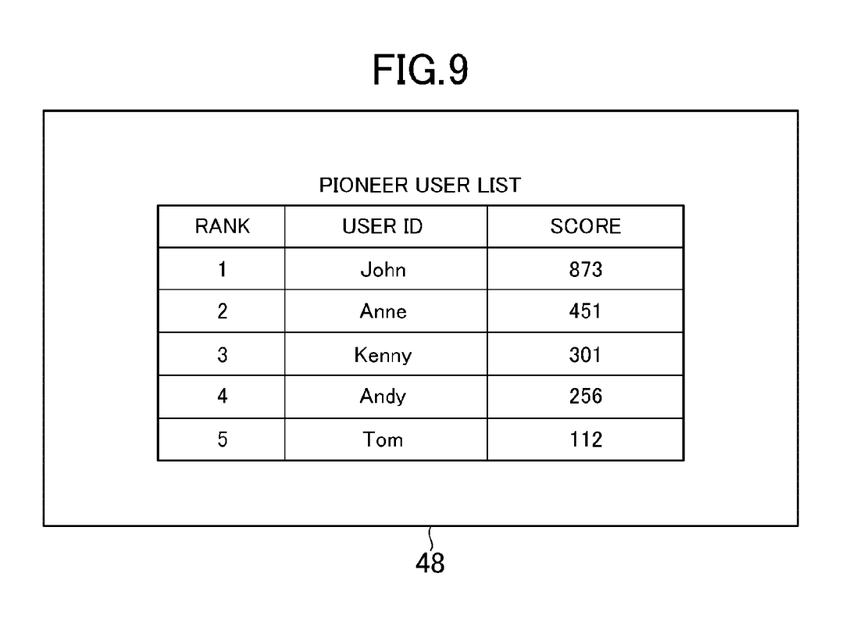
FIG. 9 is a diagram illustrating an example of a pioneer user list page.

Further, in response to the request received from the user of the analysis system 10 after the above-mentioned processing is finished, the page generation unit 32 generates a pioneer user list page 48 illustrated in FIG. 9. Then, the page output unit 34 transmits the generated pioneer user list page 48 to the client 14. When receiving the pioneer user list page 48, the client 14 displays the pioneer user list page 48 on the display. Placed on the pioneer user list page 48 are the rank of the user who ranks within top five in the pioneer user data 44, the user ID of the user who ranks within top five in the pioneer user data 44, and the score of the user who ranks within top five in the pioneer user data 44.

Note that, under the condition that the user clicks on the user ID placed on the pioneer user list page 48, the page generation unit 32 may be configured to generate a page on which the content related to the clicked user ID (for example, content posted by the user associated with the clicked user ID) is placed. Then, the page output unit 34 may be configured to transmit this page to the client 14, and the client 14 may be configured to display the received page.

Further, under the condition that the user clicks on the user ID placed on the pioneer user list page 48, the analysis system 10 may be configured to store the clicked user ID in association with the user ID of the user who performed the clicking action. Then, in response to the request received from the client 14, the analysis system 10 may be configured to provide the information related to the user associated with the user of the client 14 to the client 14 that is a request source.

Further, in addition to the rank of the user, the user ID of the user, and the score of the user, the page generation unit 32 may be configured to place, on the pioneer user list page 48, the information to be a reference for the user in selecting the user ID placed on the pioneer user list page 48 (for example, information used for the analysis performed by the analysis system 10 such as the post count of the content posted within the pioneer time interval by the user associated with the user ID, words and phrases included a predetermined number of times or more in the content posted by the user associated with the user ID, or an attribute associated with the user ID (for example, sex or address)) together.

Note that, the example of the flow of the analysis processing for the content performed by the analysis system 10 according to this embodiment is not limited to the above-mentioned processing example.

For example, determination processing for the cluster performed by the cluster value identifying unit 26 is not limited to the above-mentioned processing illustrated as Step S204 and Step S205. For example, with regard to each of a plurality of predefined threshold values (for example, one second, two seconds, three seconds, . . . ), the cluster value identifying unit 26 may be configured to set the cluster 42 so that a series of content management data 40 whose interval of the posted date/time is smaller than the threshold value belong to the same cluster 42. Then, the cluster value identifying unit 26 may be configured to calculate the sum of the set number of clusters 42 and the number of gaps between the cluster 42 and the cluster 42. For example, as in FIG. 6, in a case where the number of clusters 42 is five with the number of gaps between the cluster 42 and the cluster 42 being four, the above-mentioned sum is calculated as nine. Then, the cluster value identifying unit 26 may be configured to identify the threshold value at which the sum calculated in this manner becomes maximum. Then, the cluster value identifying unit 26 may be configured to set the cluster 42 so that the series of content management data 40 for which the interval of the date/time at which the content was posted is smaller than the identified threshold value belong to the same cluster 42.

Further, for example, the definition of the posted time difference is not limited to the above-mentioned processing example. For example, for each of time ranges obtained by dividing a predetermined one cycle of time (for example, 24 hours) into a predetermined number (for example, 100) (hereinafter, referred to as "standard posting speed application time ranges"), the cluster value identifying unit 26 may be configured to calculate a reciprocal of the time difference between the posted date/time of the content management data 40 associated with the post within the time range and the posted date/time of the content management data 40 that comes immediately before in the order of the posted date/time. Here, in a case where the time difference is equal to or shorter than 0.5 seconds, it is assumed that the reciprocal of the time difference is handled as 2.0. Then, the cluster value identifying unit 26 may be configured to calculate a mean value of the reciprocals of the time differences calculated in this manner as a standard posting speed within the corresponding standard posting speed application time range. Then, in the above-mentioned processing illustrated as Step S203, the cluster value identifying unit 26 may be configured to associate each piece of content management data 40 that does not come first in the order of the posted date/time with, instead of the above-mentioned posted time difference, a standard posted time difference that is a product of the standard posting speed within the standard posting speed application time range including the posted date/time of the each piece of content management data 40 and the time difference between the posted date/time represented by the posted date/time data included in the each piece of content management data 40 and the posted date/time represented by the posted date/time data included in a piece of content management data 40 that comes immediately before in the order of the date/time at which the content was posted. Then, in Step S204 and the subsequent processing, the analysis system 10 may be configured to use the standard posted time difference associated in this manner, instead of the posted time difference in the above-mentioned processing example.

Further, for example, in the above-mentioned processing illustrated as Step S209, the period identifying unit 28 may be configured to divide the time corresponding to the cluster 42 (or integrated cluster 42a) identified in the processing illustrated as Step S208 into three sections of time having an equal post count of the content within the time.

Further, for example, in the above-mentioned processing illustrated as Step S209, the period identifying unit 28 may be configured to integrate the third cluster 42-3 that comes between the second cluster 42-2 and the fourth cluster 42-4 in terms of the associated posted date/time into the integrated cluster 42a.

Further, for example, the condition data may represent the character string representing a content name, the character string representing a website URL, the character string representing a tag name, and the like. Then, the data collecting unit 22 may be configured to acquire the content that satisfies the above-mentioned condition (for example, content whose name matches the character string represented by the condition data, content such as a blog article whose location is indicated by the website URL represented by the condition data, and content including a tag whose tag name matches the character string represented by the condition data). Then, the analysis system 10 may be configured to perform the analysis such as described above on the content acquired by the data collecting unit 22.

Second Embodiment

Hereinafter, a second embodiment, which is another embodiment of the present invention, is described in detail below referring to the drawings.

The overall configuration of a computer network according to the second embodiment is illustrated by the same overall configuration diagram as FIG. 1. Further, the social media system 12 according to the second embodiment provides a social bookmark service. Further, an example of functions implemented by the analysis system 10 according to the second embodiment is illustrated by the same functional block diagram as FIG. 2.

Figure 10:
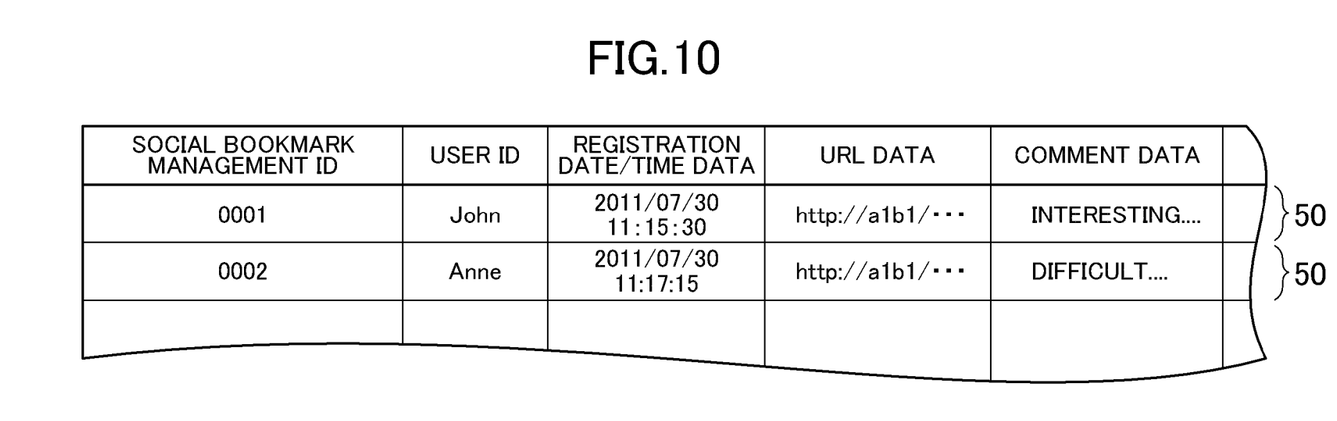
FIG. 10 is a diagram illustrating an example of social bookmark management data.

In the second embodiment, a predetermined URL is previously stored in the data storage unit 20 as the condition data. Then, the data collecting unit 22 acquires, from the social media system 12, a social bookmark which is registered in the social media system 12 and which satisfies the condition represented by the above-mentioned condition data (for example, being a social bookmark for a web page whose location is indicated by the URL represented by the condition data). Then, the data collecting unit 22 executes an analysis of the social bookmark acquired from the social media system 12, to thereby generate social bookmark management data 50 exemplified in FIG. 10 and cause the data storage unit 20 to store the social bookmark management data 50. In this embodiment, the social bookmark acquired from the social media system 12 is managed as the social bookmark management data 50. As illustrated in FIG. 10, the social bookmark management data 50 includes, a social bookmark management ID that is the identifier of the social bookmark management data 50, the user ID that is the identifier of the user who performed registration of the social bookmark, registration date/time data representing the date/time at which the registration of the social bookmark was performed, URL data representing the URL of the web page subjected to social bookmarking (URL of a link target), and comment data representing the comment registered by the user in the registration of the social bookmark, etc.

In this manner, in this embodiment, the social bookmark management data 50 based on the social bookmark registered in the social media system 12 is stored in the data storage unit 20.

Hereinafter, of the social bookmark management data 50 stored in the data storage unit 20, a time that has passed since the earliest registration date/time of the social bookmark, which is represented by the registration date/time data included in the social bookmark management data 50, until the last registration date/time of the social bookmark, which is represented by the registration date/time data included in the social bookmark management data 50, is referred to as an analysis subject time T2.

Figure 11:
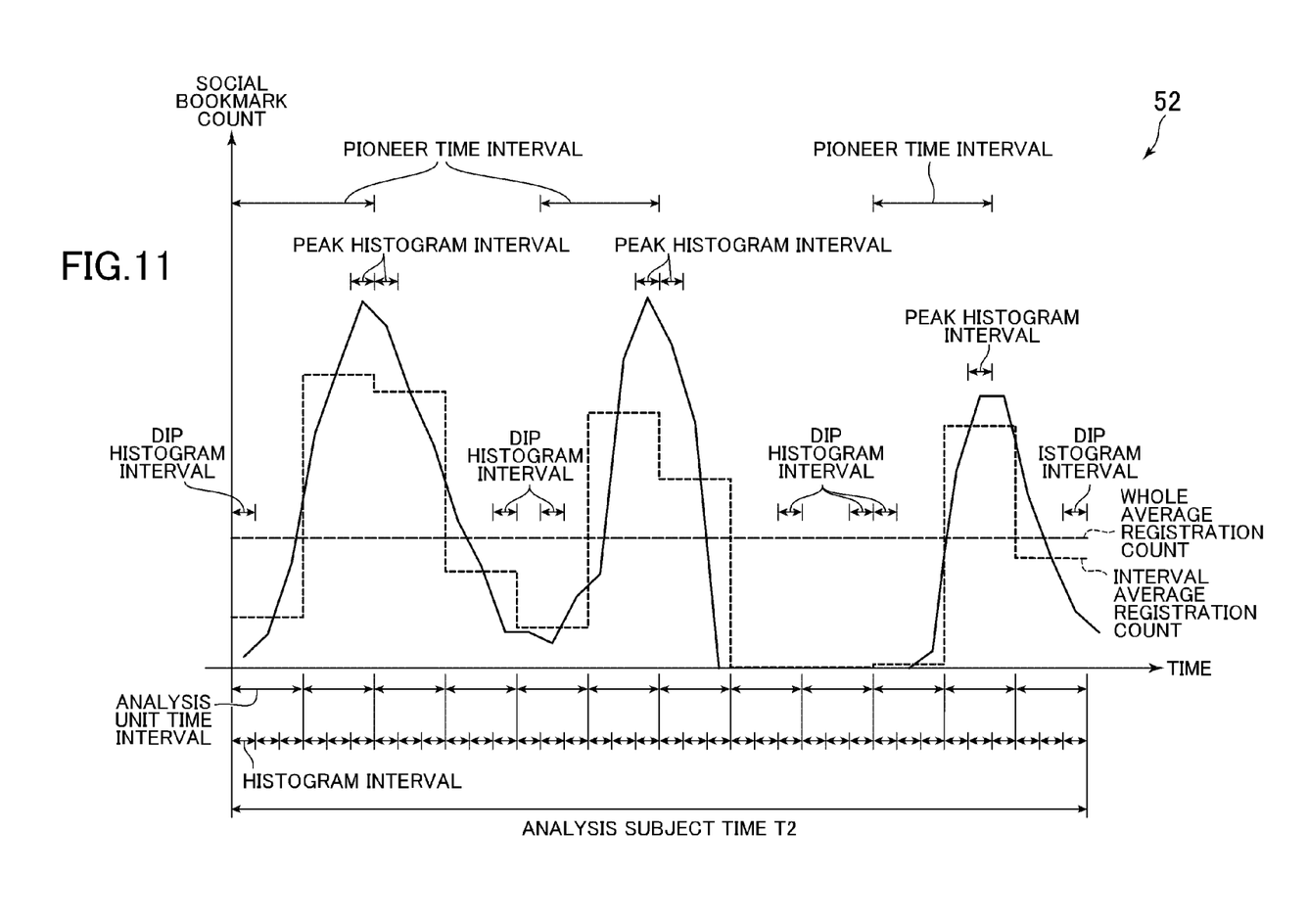
FIG. 11 is a diagram schematically illustrating an example of a histogram.

Then, based on the social bookmark management data 50 stored in the data storage unit 20, the cluster value identifying unit 26 generates a histogram 52 indicating a registration frequency of the social bookmark (see FIG. 11). In the histogram 52 according to this embodiment, a social bookmark count indicating the number of social bookmarks whose registration date/time is within a range of time indicated by the time interval (number of times that the social bookmark is registered per unit time) is indicated for each of time intervals obtained by dividing the lapse of time since a time point at which the first social bookmark for the web page whose location is indicated by the URL represented by the condition data was registered in units of a predetermined time (for example, in units of five minutes) (hereinafter, referred to as "histogram intervals").

Then, the cluster value identifying unit 26 executes smoothing on the histogram 52. Specifically, the cluster value identifying unit 26 changes the number of social bookmarks associated with each of the histogram intervals based on a mathematical expression, for example, (number of social bookmarks associated with a given histogram interval)=($\frac{1}{5}$ of the number of social bookmarks associated with the previous histogram interval)+($\frac{3}{5}$ of the number of social bookmarks associated with the given histogram interval)+($\frac{1}{5}$ of the number of social bookmarks associated with the subsequent histogram interval). FIG. 11 is a diagram schematically illustrating an example of the histogram 52 after the above-mentioned smoothing has been executed thereon. FIG. 11 illustrates the social bookmark count associated with each of the histogram intervals after the smoothing has been executed. In the second embodiment, the social bookmark count associated with the histogram interval is handled as the value of the parameter representing the level of the ground swell of interest related to the web page being the information provided to the users.

Then, based on the social bookmark count associated with each of the histogram intervals after the above-mentioned smoothing, with regard to each of analysis unit time intervals that is a time interval which is obtained by dividing the analysis subject time at even time intervals and which is associated with a predetermined number (in the example of FIG. 11, three) of successive histogram intervals, the cluster value identifying unit 26 calculates an average registration count of the social bookmarks per unit time within the analysis unit time interval (hereinafter, referred to as "interval average registration count"). Further, the cluster value identifying unit 26 calculates an average registration count of the social bookmarks per unit time with regard to a time subjected to the analysis (hereinafter, referred to as "whole average registration count"). FIG. 11 also illustrates the interval average registration count and the whole average registration count.

Then, the period identifying unit 28 identifies, as a peak histogram interval, the histogram interval in which the number of associated social bookmarks is maximum within the analysis unit time interval in which the interval average registration count is equal to or larger than the whole average registration count. The peak histogram interval is identified for each of the analysis unit time intervals in which the interval average registration count is equal to or larger than the whole average registration count. Then, the period identifying unit 28 identifies, as a dip histogram interval, the histogram interval in which the number of associated social bookmarks is minimum (may be zero) within the analysis unit time interval in which the interval average registration count is smaller than the whole average registration count. The dip histogram interval is identified for each of the analysis unit time intervals in which the interval average registration count is smaller than the whole average registration count.

Note that, in this embodiment, in a case where the analysis unit time interval in which the interval average registration count is equal to or larger than the whole average registration count includes a plurality of histogram intervals in which the number of social bookmarks indicated by the histogram 52 is maximum, the histogram interval associated with the earliest time is identified as the peak histogram interval. Further, in this embodiment, in a case where the analysis unit time interval in which the interval average registration count is smaller than the whole average registration count includes a plurality of histogram intervals in which the number of social bookmarks indicated by the histogram 52 is minimum, the histogram interval associated with the last time is identified as the dip histogram interval.

Then, the period identifying unit 28 identifies, as the pioneer time interval, the time interval corresponding to a range from a start time point of the dip histogram interval to an end time point of the peak histogram interval for each of combinations of the dip histogram interval and the peak histogram interval that are temporally adjacent to each other with the dip histogram interval preceding the peak histogram interval in terms of time. In the example of FIG. 11, three pioneer time intervals are identified. In the second embodiment, the pioneer time interval is handled as the period in which the ground swell of interest related to the web page being the information provided to the users grows with the lapse of time.

Then, the user feature identifying unit 30 sets an initial value of the score of each of the users to zero. Then, based on the social bookmark management data 50, the user feature identifying unit 30 identifies the user who performed the registration of the social bookmark for each of the histogram intervals within the range of the pioneer time interval. Then, with regard to the identified user, the interval average registration count within the analysis unit time interval including the histogram interval is added to the score of the user.

Figure 7:
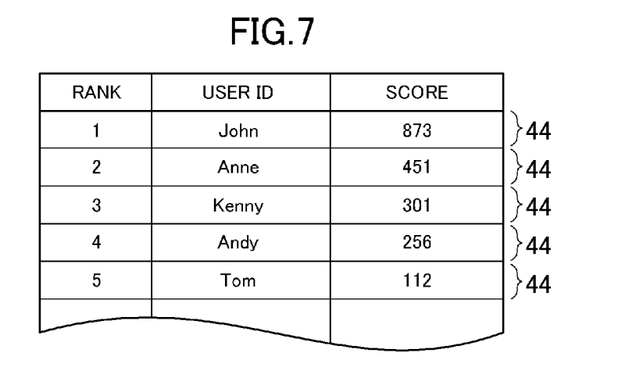
FIG. 7 is a diagram illustrating an example of pioneer user data.

Then, the user feature identifying unit 30 generates the same pioneer user data 44 as in FIG. 7 that includes: the rank that is set in order from the user whose score calculated as described above is larger and is associated with each of the users; the user ID of the user; and the score calculated for the user, and causes the data storage unit 20 to store the pioneer user data 44.

In the second embodiment, the page generation unit 32 acquires at least one of the interval average registration count, the whole average registration count, the information representing a pioneer time interval, and the pioneer user data 44 in response to a request received from the user of the analysis system 10 after the above-mentioned processing is finished. Then, based on the acquired data, the page generation unit 32 generates a pioneer user list page 48 as illustrated in FIG. 9. Then, the page output unit 34 transmits the generated pioneer user list page 48 to the client 14. When receiving the pioneer user list page 48, the client 14 displays the pioneer user list page 48 on the display. Placed on the pioneer user list page 48 are the rank of the user who ranks within top five in the pioneer user data 44, the user ID of the user who ranks within top five in the pioneer user data 44, and the score of the user who ranks within top five in the pioneer user data 44.

Further, in the second embodiment, in response to the request received from the user of the analysis system 10 after the above-mentioned processing is finished, the page generation unit 32 generates a pioneer social bookmark list page (not shown) in which a list of titles of the social bookmarks that have recently been registered by a pioneer user designated by the user of the analysis system 10 and a list of titles of the social bookmarks that were registered within the pioneer time interval by the pioneer user designated by the user of the analysis system 10 are shown in a list format. At this time, each of the titles included in the lists is set as a link to the web page subjected to the social bookmarking. Then, the page output unit 34 transmits the generated pioneer social bookmark list page to the client 14. When receiving the pioneer social bookmark list page, the client 14 displays the pioneer social bookmark list page on the display.

Further, in addition to the rank of the user, the user ID of the user, and the score of the user, the page generation unit 32 may be configured to place, on the pioneer user list page 48, the information to be a reference for the user designating a pioneer user (for example, information used for the analysis performed by the analysis system 10 such as the social bookmark registration count within the pioneer time interval of the user associated with the user ID, words and phrases included a predetermined number of times or more in the web page subjected to the social bookmarking registered by the user associated with the user ID, or an attribute associated with the user ID (for example, sex or address)) together.

For example, under the condition that the web page containing information such as news is provided to the user, the comment being a reaction to the information is posted to the social media system 12 that provides the electronic bulletin board service, or the social bookmark for the web page containing the information such as news is registered in the social media system 12 that provides the social bookmark service. In this manner, the information related to the information provided to the users is registered in the social media system 12.

Then, such content can be collected from the social media system 12 by, for example, designating the condition such as a keyword in the first embodiment or the URL in the second embodiment. Further, it may be highly possible that the user who is most likely to register the content in the social media system 12 during the period in which the ground swell of interest related to the information provided to the users grows with the lapse of time, such as the leading time in the first embodiment or the pioneer time interval in the second embodiment, may be the user who is highly sensitive to the information provided to the users (pioneer user). Therefore, it is conceivable that the user whose rank is high (score is large) within the pioneer user data 44 in the first embodiment or the second embodiment is the user who is highly sensitive to the information provided to the users (pioneer user). Therefore, the pioneer user data 44 can be used to discriminate whether or not the user is the pioneer user.

Note that, in the first embodiment, the analysis system 10 may be configured to generate, for example, follower user data (or early adopter user data) including: the rank of each user that is set in order from the user whose post count indicating the number of posts made within the range of the tailing time (or intermediate time) in the first embodiment is larger; the user ID of the user; and the score representing the post count identified for the user in the processing illustrated as Step S210, and cause the data storage unit 20 to store the follower user data (or early adopter user data).

Further, in the second embodiment, the analysis system 10 may be configured to identify, as a follower time interval, the time interval corresponding to a range from a start time point of the peak histogram interval to an end time point of the dip histogram interval for each of combinations of the peak histogram interval and the dip histogram interval that are temporally adjacent to each other with the peak histogram interval preceding the dip histogram interval in terms of time. Then, the analysis system 10 may be configured to calculate the score by adding the interval average registration count within the analysis unit time interval including the histogram interval with regard to the user who performed the registration of the social bookmark for each of the histogram intervals within the range of the follower time interval. Then, the analysis system 10 may be configured to generate the follower user data including: the rank that is set in order from the user whose score calculated as described above is larger; the user ID of the user; and the score calculated for the user, and cause the data storage unit 20 to store the follower user data.

In this manner, according to the first embodiment or the second embodiment, it is possible to identify a feature of the user (for example, whether or not the user is the pioneer user, whether or not the user is an early adopter user, or whether or not the user is a follower user) based on the posting of the content related to the provided information.

Further, it is conceivable that the pioneer user data, the early adopter user data, and the follower user data are useful for public relations, advertisements, recommendation of information, provision of information, and the like. Specifically, for example, it is conceivable to offer the information on new products to the pioneer user, the information on best-selling products to the follower user, and the like. Further, it is conceivable to predict the future trends by monitoring the content posted by the pioneer user. Further, it is conceivable to commission the pioneer user to write a review article. Further, it is conceivable to provide new information to the pioneer user to thereby promote the pioneer user to post more content for sending out the new information.

Further, in the first embodiment and the second embodiment, for example, the page generation unit 32 may be configured to generate a page on which (1) information obtained by associating the pioneer time interval with the value associated with the pioneer time interval (for example, representative value of the cluster value within the pioneer time interval (for example, maximum value of the cluster value within the pioneer time interval) in the first embodiment or representative value of the interval average registration count within the pioneer time interval (for example, maximum value of the interval average registration count within the pioneer time interval) in the second embodiment), (2) information obtained by associating the pioneer time interval with the words and phrases associated with the pioneer time interval and the number of the included words and phrases (for example, words and phrases included in the posted content and the number of the included words and phrases in the first embodiment or words and phrases included in the web page subjected to the social bookmarking and the number of the included words and phrases in the second embodiment), (3) information obtained by associating the pioneer time interval with a ratio of the number of users whose post count of the content, social bookmark registration count, or the like within the pioneer time interval is equal to or larger than a predetermined number to the total number of users who performed the posting of the content, the registration of the social bookmark, or the like within the pioneer time interval, and other such information are placed.

Further, in the first embodiment and the second embodiment, for example, the analysis system 10 according to this embodiment may be configured to present information such as the words and phrases obtained from the analysis performed by the analysis system 10, the URLs, and the tags. For example, the page generation unit 32 may be configured to generate a page on which the information obtained by associating the pioneer time interval with a predetermined number or more of words and phrases included in the content posted within the pioneer time interval, the tags, the URLs, and the like, and other such information are placed. Further, in the first embodiment and the second embodiment, for example, the page generation unit 32 may be configured to generate a page on which a list of titles and the like of the content posted within the pioneer time interval are placed. Then, the page output unit 34 may be configured to transmit this page to the client 14, and the client 14 may be configured to display the received page. In a case where the analysis system 10 receives the user's selection of the title or the like included in the list from the client 14, the page generation unit 32 may be configured to generate a page on which the content associated with the selected title or the like is placed. Then, the page output unit 34 may be configured to transmit this page to the client 14, and the client 14 may be configured to display the received page.

Further, in the first embodiment and the second embodiment, for example, the analysis system 10 may be configured to receive designation of the pioneer time interval from the client 14. Under the condition that there occurs a pioneer time interval in which the value identified based on the pioneer time interval (for example, maximum value of the cluster value or maximum value of the interval average registration count within the pioneer time interval) exceeds the value identified based on the designated pioneer time interval, the analysis system 10 may be configured to notify the client 14 that is a transmission source of the designation of the pioneer time interval to that effect.

Further, for example, based on the feature of the user (whether or not the user is the pioneer user, whether or not the user is the early adopter user, whether or not the user is the follower user, or the like), the analysis system 10 may be configured to identify the content recommended to the user. Then, the analysis system 10 may be configured to present the content recommended to the user in response to the request received from the user.

Further, for example, based on the keyword, the pioneer user, and the like associated with each of the plurality of pioneer time intervals, the analysis system 10 may be configured to identify a relationship between the pioneer time intervals. Then, the information representing the identified relationship may be provided to the client 14.

Note that, the present invention is not limited to the above-mentioned embodiments.

For example, the analysis system 10 may be configured to analyze the comment posted in the discussion thread on an electronic bulletin board whose contents change with the lapse of time. At this time, based on the feature amount corresponding to the comments posted within the range of time from a predetermined time before (for example, three hours before) the time instant to execute the analysis until the time instant to execute the analysis, the analysis system 10 may be configured to periodically calculate the value of an index (hereinafter, referred to as "likelihood") indicating a level of the ground swell of interest in the post within the range of time.

Based on the comments posted within the above-mentioned range of time, for example, the analysis system 10 performs calculation of each of the following feature amounts (1) to (13). Then, the analysis system 10 examines whether or not the calculated feature amount satisfies a predetermined condition, and under the condition that the condition is satisfied, the value of the likelihood is incremented by one. Here, the likelihood is assumed to have an initial value of zero.

(1) Regular visitor density: represents an extent to which a plurality of persons appear within a predetermined number of posts with each of the persons appearing a plurality of times. For example, the analysis system 10 repeats processing for "calculating a number $V\_A1$ of users who submitted a predetermined number $A3$ or larger number of posts including a predetermined number $A2$ or larger number of question-type posts (for example, posts including a sentence that ends with "?") among the posts submitted successively by a predetermined post count $A1$" within a range of the posts to be subjected to the analysis while shifting the range of the posts submitted successively by the predetermined post count $A1$ by a predetermined post count (for example, by one post), to thereby calculate the value $V\_A1$ within the respective ranges. Then, the analysis system 10 identifies a maximum value $V\_A2$ of the value $V\_A1$ calculated for the respective ranges as the regular visitor density. Then, the analysis system 10 increments the value of the above-mentioned likelihood by one under the condition that the value V_A2 is equal to or larger than a predetermined threshold value th_A2.

(2) Multiple concurrence factor: represents an extent to which a large number of entangled chains of short posts occur within a short period of time. For example, the analysis system 10 repeats processing for "calculating a number V_B1 of combinations of a given post and the reply post submitted within a predetermined time B2 after the given post among the posts submitted within a predetermined period B1" within the range of the posts to be subjected to the analysis while shifting the range of the posts submitted within the predetermined period B1 by a predetermined time (for example, by one minute), to thereby calculate the number V_B1 within the respective ranges. Then, the analysis system 10 identifies a number V_B2 of the above-mentioned ranges exhibiting the number V_B1 equal to or larger than a predetermined number B3 as the multiple concurrence factor. Then, the analysis system 10 increments the value of the above-mentioned likelihood by one under the condition that the value V_B2 is equal to or larger than a predetermined threshold value th_B2.

(3) Conversational ball rolling factor: represents an extent to which a plurality of users alternately post comments. For example, the analysis system 10 repeats processing for "identifying a user who submitted a predetermined number C3 or larger number of posts including a predetermined number C2 or larger number of question-type posts (for example, post including a sentence that ends with "?") among the posts submitted successively by a predetermined post count C1, then arranging the user's posts in ascending order of the post time, and calculating a number V_C1 of groups assuming that one group represents a group of posts submitted successively by the same user" within the range of the posts to be subjected to the analysis while shifting the range of the posts submitted successively by the predetermined post count C1 by a predetermined post count (for example, by one post), to thereby calculate the number V_C1 within the respective ranges. Then, the analysis system 10 identifies a maximum value V_C2 of the calculated value V_C1 as the conversational ball rolling factor. Then, the analysis system 10 increments the value of the above-mentioned likelihood by one under the condition that the value V_C2 is equal to or larger than a predetermined threshold value th_C2.

(4) Agreement factor: represents an extent to which a comment is posted with the intention of agreeing with another person's post. For example, the analysis system 10 repeats processing for "calculating a post count V_D1, a count of posts including a predetermined magic word (for example, "me as well") among the posts submitted successively by a predetermined post count D1" within the range of the posts to be subjected to the analysis while shifting the range of the posts submitted successively by the predetermined post count D1 by a predetermined post count (for example, by one post), to thereby calculate the number V_D1 within the respective ranges. Then, the analysis system 10 identifies a maximum value V_D2 of the calculated value V_D1 as the agreement factor. Then, the analysis system 10 increments the value of the above-mentioned likelihood by one when the value V_D2 is equal to or larger than a predetermined threshold value th_D2.

(5) Normality: represents an extent to which the content of a comment makes sense with existence of some sentence structure and some logical structure. For example, the analysis system 10 repeats processing for "calculating a number V_E1 of comments which do not include ASCII art (including a number E2 or larger number of the same symbols in series) or a half-width katakana and which have a byte count equal to or larger than a predetermined number E3 among the posts submitted successively by a predetermined post count E1" within the range of the posts to be subjected to the analysis while shifting the range of the posts submitted successively by the predetermined post count E1 by a predetermined post count (for example, by one post), to thereby calculate the number V_E1 within the respective ranges. Then, the analysis system 10 identifies a maximum value V_E2 of the calculated value V_E1 as the normality. Then, the analysis system 10 increments the value of the above-mentioned likelihood by one under the condition that the value V_E2 is equal to or larger than a predetermined threshold value th_E2.

(6) Reaction-to-long-sentence successiveness: represents an extent to which a plurality of short-sentence reply posts are successively submitted as a reply to a comment formed of long sentences. For example, assuming that the successive replies to a post is referred to as "chain", the analysis system 10 calculates a number V_F1 of reply posts submitted in reply to an initial post (which also include another reply post to the reply post) among all chains within the range of the posts to be subjected to the analysis, the initial post being a comment having a byte count equal to or larger than a predetermined number F1, the reply post being a comment having a byte count equal to or smaller than a predetermined number F2. Then, the analysis system 10 identifies a maximum value V_F2 of the calculated value V_F1 as the reaction-to-long-sentence successiveness. Then, the analysis system 10 increments the value of the above-mentioned likelihood by one under the condition that the value V_F2 is equal to or larger than a predetermined threshold value th_F2.

(7) Gratitude factor: represents an extent to which a comment posted with the intention of expressing gratitude is included in the posts submitted within a fixed segment. For example, the analysis system 10 repeats processing for "calculating a number V_G1 of comments including a predetermined magic word belonging to a type of gratitude (for example, "thank you"; however, excluding a predetermined NG word (for example, "thank you so much")) among the posts submitted successively by a predetermined post count G1" within the range of the posts to be subjected to the analysis while shifting the range of the posts submitted successively by the predetermined post count G1 by a predetermined post count (for example, by one post), to thereby calculate the number V_G1 within the respective ranges. Then, the analysis system 10 identifies a maximum value V_G2 of the calculated value V_G1 as the gratitude factor. Then, the analysis system 10 increments the value of the above-mentioned likelihood by one under the condition that the value V_G2 is equal to or larger than a predetermined threshold value th_G2.

(8) Short-sentence successiveness: represents an extent to which a short-sentence comment does not appear successively. For example, the analysis system 10 repeats processing for "calculating a number V_H1 of times that a comment having a byte count equal to or smaller than a predetermined number H2 appears successively among the posts submitted successively by a predetermined post count H1" within the range of the posts to be subjected to the analysis while shifting the range of the posts submitted successively by the predetermined post count H1 by a predetermined post count (for example, by one post), to thereby calculate the number V_H1 within the respective ranges. Then, the analysis system 10 identifies a maximum value V_H2 of the calculated value V_H1 as the short-sentence successiveness. Then, the analysis system 10 increments the value of the above-mentioned likelihood by one under the condition that the value V_H2 is equal to or smaller than a predetermined threshold value th_H2.

(9) Instantaneous speed: represents an extent to which a situation that the post count per unit time is large occurs. For example, the analysis system 10 repeats processing for "examining whether or not a post was submitted a predetermined number I2 or larger number of times within a predetermined period I1" within the range of the posts to be subjected to the analysis while shifting the predetermined period I1 by a predetermined time (for example, by one minute), to thereby examine within the respective ranges whether or not a post was submitted the predetermined number I2 or larger number of times. Then, the analysis system 10 identifies a number V_I1 of times that it has been examined that a post was submitted the predetermined number I2 or larger number of times, as the instantaneous speed. Then, the analysis system 10 increments the value of the above-mentioned likelihood by one under the condition that the value V_I1 is equal to or larger than a predetermined threshold value th_I1.

(10) Magic word appearance frequency: represents an appearance frequency of a predetermined magic word. For example, examples of the magic word in the case of the alert mode include "download", "update", "started", "specifications", and "support", while examples of the magic word in the case of the repute mode include "release", "thank you", and "the same". Note that, the magic words are stored in the data storage unit 20 in advance. The analysis system 10 identifies, for example, a number mwa of times that the magic word is included in the comment data of the discussion thread data, as the magic word appearance frequency. Then, the analysis system 10 increments the value of the above-mentioned likelihood by one under the condition that the number mwa is equal to or larger than a predetermined number th_mwa.

(11) Magic word recent appearance frequency: represents a recent appearance frequency of a predetermined magic word. The analysis system 10 identifies, for example, a number mwr of times that the magic word is included in the comment data indicating the recently-posted comments (for example, comments posted within one hour immediately before the search start time point) among the comment data of the discussion thread data, as the magic word recent appearance frequency. Then, the analysis system 10 increments the value of the above-mentioned likelihood by one under the condition that the number mwr is equal to or larger than a predetermined number th_mwr.

(12) User-designated keyword appearance frequency: represents the appearance frequency of the keyword set in a keyword conditional expression. Note that, in this embodiment, a predetermined word assumed to be common is not to be counted in the appearance frequency. The analysis system 10 identifies, for example, a number kwa of times that the keyword to be counted is included in the comment data of the discussion thread data, as the user-designated keyword appearance frequency. Then, the analysis system 10 increments the value of the above-mentioned likelihood by one under the condition that the number kwa is equal to or larger than a predetermined number th_kwa.

(13) User-designated keyword recent appearance frequency: represents the recent appearance frequency of a keyword set in the keyword conditional expression. The analysis system 10 identifies, for example, a number kwr of times that the keyword is included in the comment data indicating the recently-posted comments (for example, comments posted within one hour immediately before the search start time point) among the comment data of the discussion thread data, as the user-designated keyword recent appearance frequency. Then, the analysis system 10 increments the value of the above-mentioned likelihood by one under the condition that the number kwr is equal to or larger than a predetermined number th_kwr.

The value of the likelihood is calculated in the above-mentioned manner. Then, the analysis system 10 may be configured to identify the post count of the comment for each of the users within the range of time in which the value of the associated likelihood is equal to or larger than a predetermined value. Then, the analysis system 10 may be configured to generate the pioneer user data 44 including: the rank that is set in order from the user whose identified post count is larger and is associated with each of the users; the user ID of the user; and the score representing the post count identified for the user, and cause the data storage unit 20 to store the pioneer user data 44.

Further, the analysis system 10 may be configured to identify the feature of the user by, for example, using the same method as described above to perform the analysis on not only the posting of the comment on the electronic bulletin board or the registration of the social bookmark, but also a registration timing of the blog article, registration of a wiki article, tweeting on Twitter (trademark), or the like.

Further, the roles to be played by the analysis system 10, the social media system 12, and the client 14 according to this embodiment are not limited to the above-mentioned ones. Further, the specific character strings described above and the specific character strings illustrated in the accompanying drawings are merely examples, and the present invention is not limited to those character strings.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An information processing system comprising a microprocessor operating under the control of a computer program, the system comprising:

an acquisition unit configured to acquire registrations of information related to provided information;

a value identifying unit that sorts the registered related information based on chronological order of registration, groups the sorted related information into clusters of related information based on time interval durations between registrations of the sorted related information, and for each cluster, identifies a value of a parameter representing a registration frequency of the related information belonging to the cluster, and associates with the cluster a term appearing in the related information belonging to the cluster;

a period identifying unit that identifies, for each cluster, based on the value of the parameter, a leading time period in which leading time period a ground swell of interest related to the provided information increases on average with a lapse of time, followed by an intermediate time period, followed by a tailing time period, in which tailing time period the ground swell of interest related to the provided information decreases on average with a lapse of time; and a feature identifying unit that identifies a leading post count indicating a number of posts made by each of the users during the leading time period, and ranks such leading post counts to categorize such users as pioneers of a trend associated with the term, an intermediate post count indicating a number of posts made by each of the users during the intermediate time period, and ranks such intermediate post counts to categorize such users as early adopters of a trend associated with the term, and a tailing post count indicating a number of posts made by each of the users during the tailing time period, and ranks such tailing post counts to categorize such users as followers of a trend associated with the term.

2. The information processing system according to claim 1, wherein the feature identifying unit categorizes users based on a number of pieces of the related information registered by users within the periods identified by the period identifying unit.

3. The information processing system according to claim 1, wherein:
the value identifying unit identifies a number of times that the related information is registered per unit time; and
the period identifying unit identifies the period during which the number of times that the related information is registered per unit time tends to increase.

4. The information processing system according to claim 1, wherein:
the value identifying unit identifies a number of times that a comment comprising a keyword related to the provided information is registered per unit time; and
the period identifying unit identifies the period during which the number of times that the comment comprising the keyword is registered per unit time tends to increase.

5. The information processing system according to claim 1, wherein:
the value identifying unit identifies a number of times that a social bookmark for a web page on which information is provided is registered per unit time; and
the period identifying unit identifies the period during which the number of times that the social bookmark for the web page on which the information is provided is registered per unit time tends to increase.

6. An information processing system comprising a microprocessor operating under the control of a computer program, the system comprising:
an acquisition unit configured to acquire registrations of information related to provided information, sort the registered related information based on chronological order of registration, group the sorted related information into clusters of related information based on time interval durations between registrations of the sorted related information, and acquire at least one of:
(1) for each cluster, a value of a parameter representing a registration frequency of the related information belonging to the cluster, and associate with the cluster a term appearing in the related information belonging to the cluster;
(2) for each cluster, information representing a leading time period in which leading time period the ground swell of interest related to the provided information increases on average with a lapse of time, an intermediate time period following the leading time period, and a tailing time period following the intermediate time period, in which tailing time period the ground swell of interest related to the provided information decreases on average with a lapse of time, the leading time period and tailing time period being identified based on the value of the parameter; and
(3) information representing a leading post count indicating a number of posts made by each of the users during the leading time period, an intermediate post count indicating a number of posts made by each of the users during the intermediate time period, and a tailing post count indicating a number of posts made by each of the users during the tailing time period; and
a presentation unit that presents information generated based on the information acquired by the acquisition unit; wherein
the leading post counts are ranked to categorize users as pioneers of a trend associated with the term, the intermediate post counts are ranked to categorize users as early adopters of a trend associated with the term, and the tailing post counts are ranked to categorize users as followers of a trend associated with the term.

7. An apparatus comprising a microprocessor performing a method, the method comprising:
acquiring registrations of information related to provided information;
sorting the registered related information based on chronological order of registration, and grouping the sorted related information into clusters of related information based on time interval durations between registrations of the sorted related information;
for each cluster, identifying a value of a parameter representing a registration frequency of the related information belonging to the cluster, and associating with the cluster a term appearing in the related information belonging to the cluster;
identifying, for each cluster, based on the value of the parameter, a leading time period in which leading time period the ground swell of interest related to the provided information increases on average with a lapse of time, followed by an intermediate time period, followed by a tailing time period, in which tailing time period the ground swell of interest related to the provided information decreases on average with a lapse of time; and
identifying a leading post count indicating a number of posts made by each of the users during the leading time period, and ranking such leading post counts to categorize such users as pioneers of a trend associated with the term, an intermediate post count indicating a number of posts made by each of the users during the intermediate time period, and ranking such intermediate post counts to categorize such users as early adopters of a trend associated with the term, and a tailing post count indicating a number of posts made by each of the users during the tailing time period, and ranking such tailing post counts to categorize such users as followers of a trend associated with the term.

8. An apparatus comprising a microprocessor operating under the control of an executable program to:
acquire registrations of information related to provided information;
sort the registered related information based on chronological order of registration, and group the sorted related information into clusters of related information based on time interval durations between registrations of the sorted related information;
for each cluster, identify a value of a parameter representing a registration frequency of the related information belonging to the cluster, and associate with the cluster a term appearing in the related information belonging to the cluster;
identify, for each cluster, based on the value of the parameter, a leading time period in which leading time period the ground swell of interest related to the provided information increases on average with a lapse of time, followed by an intermediate time period, followed by a tailing time period, in which tailing time period the ground swell of interest related to the provided information decreases on average with a lapse of time; and identify a leading post count indicating a number of posts made by each of the users during the leading time period, and rank such leading post counts to categorize such users as pioneers of a trend associated with the term, an intermediate post count indicating a number of posts made by each of the users during the intermediate time period, and rank such intermediate post counts to categorize such users as early adopters of a trend associated with the term, and a tailing post count indicating a number of posts made by each of the users during the tailing time period, and rank such tailing post counts to categorize such users as followers of a trend associated with the term.

9. A non-transitory computer-readable recording medium encoded with a program comprising instructions to:

acquire registrations of information related to provided information;

sort the registered related information based on chronological order of registration, and group the sorted related information into clusters of related information based on time interval durations between registrations of the sorted related information;

for each cluster, identify a value of a parameter representing a registration frequency of the related information belonging to the cluster, and associate with the cluster a term appearing in the related information belonging to the cluster;

identify, for each cluster, based on the value of the parameter, a leading time period in which leading time period the ground swell of interest related to the provided information increases on average with a lapse of time, followed by an intermediate time period, followed by a tailing time period, in which tailing time period the ground swell of interest related to the provided information decreases on average with a lapse of time; and identify a leading post count indicating a number of posts made by each of the users during the leading time period, and rank such leading post counts to categorize such users as pioneers of a trend associated with the term, an intermediate post count indicating a number of posts made by each of the users during the intermediate time period, and rank such intermediate post counts to categorize such users as early adopters of a trend associated with the term, and a tailing post count indicating a number of posts made by each of the users during the tailing time period, and rank such tailing post counts to categorize such users as followers of a trend associated with the term.

\* \* \* \* \*